United States Patent
Lappin, Jr.

(10) Patent No.: US 7,047,453 B2
(45) Date of Patent: May 16, 2006

(54) METHOD AND APPARATUS FOR MANAGING NETWORK TRAFFIC USING CYCLICAL REDUNDANCY CHECK HASH FUNCTIONS

(75) Inventor: James B. Lappin, Jr., San Francisco, CA (US)

(73) Assignee: Nokia, Inc., Irving, TX (US)

( * ) Notice: Subject to any disclaimer, the term of this patent is extended or adjusted under 35 U.S.C. 154(b) by 365 days.

(21) Appl. No.: 10/714,551

(22) Filed: Nov. 13, 2003

(65) Prior Publication Data

US 2005/0108617 A1    May 19, 2005

(51) Int. Cl.
*G06F 11/00* (2006.01)
(52) U.S. Cl. .......................... 714/52; 370/392
(58) Field of Classification Search .................... 714/52, 714/53, 56, 43, 758, 759; 370/392, 395
See application file for complete search history.

(56) References Cited

U.S. PATENT DOCUMENTS

| | | | |
|---|---|---|---|
| 6,434,717 B1* | 8/2002 | Fujii | 714/758 |
| 6,775,281 B1* | 8/2004 | Brown | 370/392 |
| 2004/0100966 A1* | 5/2004 | Allen et al. | 370/395.1 |
| 2004/0221221 A1* | 11/2004 | Yoshida et al. | 714/758 |
| 2005/0147113 A1* | 7/2005 | Brown | 370/428 |

* cited by examiner

*Primary Examiner*—Nadeem Iqbal
(74) *Attorney, Agent, or Firm*—Jamie L. Wiegand; Darby & Darby

(57) ABSTRACT

Methods, apparatus and systems are directed to managing network traffic using a variable length Cyclical Redundancy Check (CRC) index to hash an address header. The invention copies an address header of a data packet to a CRC generator. A CRC index is determined based, in part, on the address header. A subset of bits is determined from the CRC index based, in part, on a predetermined bit mask. The address header and the data payload are then combined with the subset of bits from the CRC index. The modified data packet is subsequently forwarded over a network. In one embodiment, the invention is implemented on a hardware circuit residing on a traffic device.

25 Claims, 3 Drawing Sheets

METHOD AND APPARATUS FOR MANAGING NETWORK TRAFFIC USING CYCLICAL REDUNDANCY CHECK HASH FUNCTIONS

FIELD OF THE INVENTION

The present invention relates generally to managing network traffic, and more particularly, to increasing efficiency in determining routing of a data packet through the use of a Cyclical Redundancy Check (CRC) hash function.

BACKGROUND OF THE INVENTION

In the process of moving data over a network, it is necessary to determine whether the data will be allowed on the network, and if so, where the data will be directed. When the data is sent from a source to a destination, the network may determine if both the sender and the recipient are valid and permitted to use the network, as well as how the data will be processed. Transport Control Protocol/Internet Protocol (TCP/IP) data is typically transferred by means of frames that include at least two components, an address header and a data payload. Information that is typically used to move the data through the network to the destination may be found in the address header in the form of a five-tuple that comprises following fields: a source address, a destination address, a source port, a destination port and a protocol.

It is not to unusual to have a network addressing scheme that supports as many as 4 billion sources having the ability to send data to any of 4 billion destinations and where each source or destination can have upwards of 64 thousand ports. Thus, trying to support such an addressing scheme may require an enormously large look-up table, as well as a traffic management system with a staggering amount of memory. On the other hand, the presence of a limited amount of traffic on a network at any given time allows the use of a smaller table that includes a lesser amount of information. To accomplish this, a hash function may be used on the pertinent information in the address header to determine an index value into the smaller table.

A hash function is a mathematical algorithm that is capable of mapping values from a substantially large domain to a smaller one. A "good" hash function includes those, in which the application of the hash function to a large set of values results in a smaller set of index values that are evenly distributed in the smaller domain. A "bad" hash function would be one, in which many of the values in the set from the larger domain are mapped into the same index value of the smaller domain. Any such occurrence is typically referred to as a collision. Because only a single connection can physically reside as an entry at any particular index value, any collision requires that additional information be kept in each table entry to further instruct the network where to look for any additional connections that hashed to the same index value. This chaining of entries that have the same index values requires a processing engine to hash to an index value, read out the entry, compare it to a pre-hashed five-tuple, and if a match is not found to use a pointer in the entry to read another entry. This procedure is repeated until either there is a match or the last entry in a chain is reached, reducing the efficiency of the processing engine because of the repetitive procedure being performed on every data packet.

Therefore, there is a need in the industry for an apparatus, method and system for managing network traffic through the use of an improved hash function. Thus, it is with respect to these considerations, and others, that the present invention has been made.

SUMMARY OF THE INVENTION

The present invention is directed to managing network traffic using a CRC index to hash an address header. Determining an address header from a data packet, the invention determines a CRC index based, in part, on particular fields in the address header. A group of predetermined bits is selected from the CRC index through the use of a masking register to form a final index value. The final index value is attached to the data packet as it is retrieved from a buffer forwarded to the network.

In accordance with one embodiment of the present invention, an apparatus is directed to managing a signal over a network. The apparatus includes a CRC circuit, a scaling circuit, and a reinsertion circuit. The CRC circuit is arranged to determine a CRC index based, in part, on a portion of an input signal. The scaling circuit is arranged to determine at least one bit from the CRC index. The reinsertion circuit is arranged to combine the at least one bit selected from the CRC index to the signal.

In accordance with another embodiment of the present invention, a device is directed to managing traffic over a network. The device includes a transceiver and an indexing device. The transceiver is arranged to determine an address header associated with a data packet in a flow of data packets and forward the address header to the indexing device. The indexing device is arranged to determine a CRC index based, in part, on the address header, determine a subset of bits from the CRC index, and combine the subset of bits with the data packet.

In accordance with yet another embodiment of the present invention, a method is directed to managing traffic over a network. The method includes determining an address header associated with a data packet in a flow of data packets, determining a CRC index based, in part, on the address header, selecting at least one bit from the CRC index, and modifying the data packet, in part, by combining the at least one selected bit with the data packet.

In accordance with a further embodiment of the present invention, a system is directed to managing traffic over a network. The system includes a first network device and a second network device. The first network device is arranged to determine an address header associated with a data packet, determine a CRC index based, in part, on the address header, determine at least one bit from the CRC index, and determine a modified data packet by combining the at least one bit from the CRC index with the data packet. The second network device is arranged to read the modified data packet from the first network device and route the modified data packet based, in part, on the CRC index information.

A more complete appreciation of the present invention and its improvements can be obtained by reference to the accompanying drawings, which are briefly summarized below, to the following detail description of presently preferred embodiments of the invention, and to the appended claims.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

DETAILED DESCRIPTION OF THE PREFERRED EMBODIMENT

Figure 1:
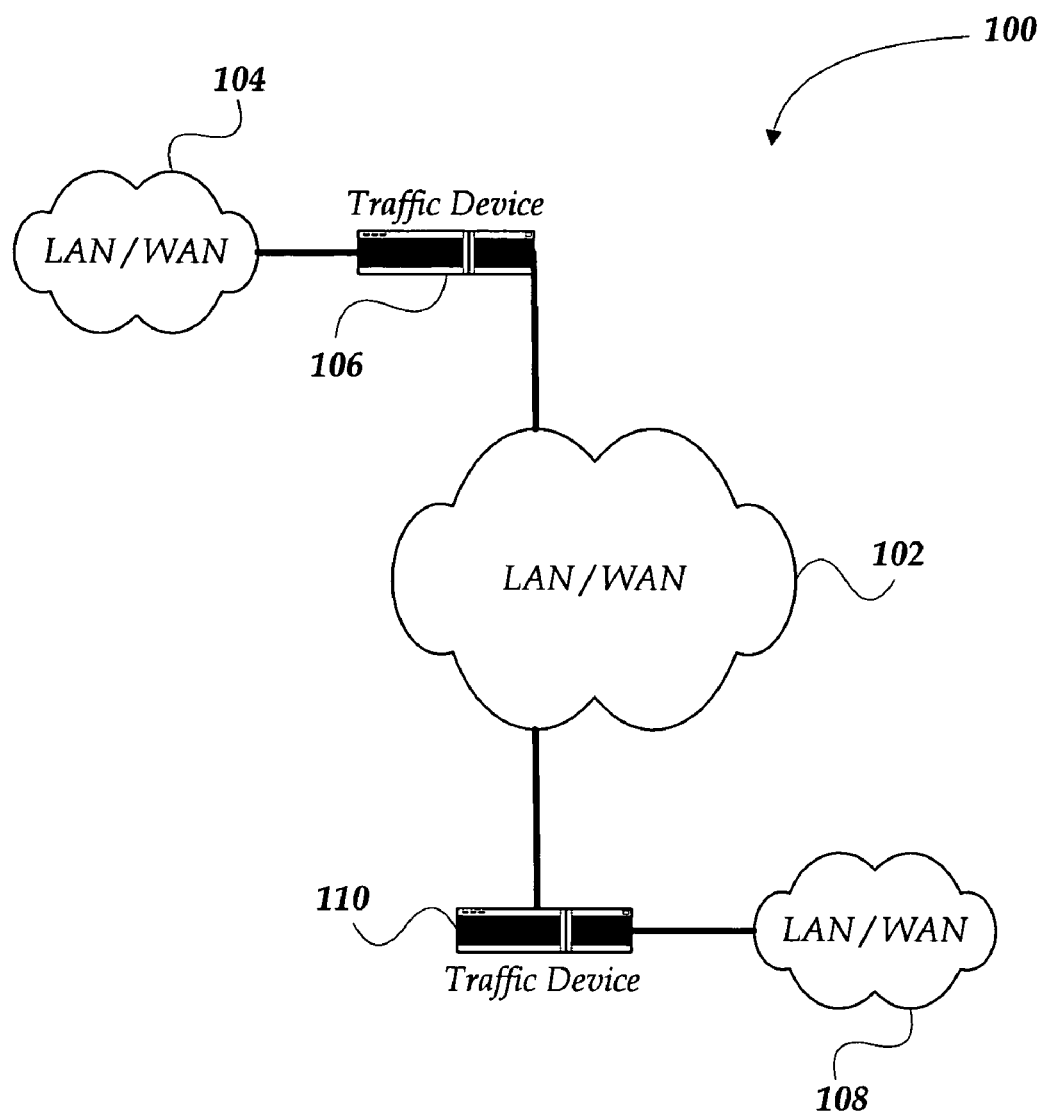
FIG. 1 illustrates one embodiment of a network system in which the present invention may be practiced.

The present invention is directed to addressing the above-mentioned shortcomings, disadvantages and problems, and will be understood by reading and studying the following specification.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The term "coupled," and "connected," include a direct connection between the things that are connected, or an indirect connection through one or more either passive or active intermediary devices or components.

The terms "comprising," "including," "containing," "having," and "characterized by," include an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed towards a device and method for determining a CRC hash function for use in modifying a data packet. The present invention is further directed towards reducing a likelihood of a collision and improving a speed to perform the CRC hash function. A "good" hash function is one which produces an index that is fairly uniformly distributed throughout a reduced domain. Simple hashing functions based on addition or multiplication of input operands, essentially XOR functions, do not accomplish uniform distribution because changing a single bit in one of the input operands usually results in a single bit change in the produced index and may produce no change in the index at all. A CRC function, as employed in the present invention, as opposed to most commonly used XOR based functions is directed to accomplishing this. A single bit change in a single operand of a CRC function has an effect upon every bit of the produced index due to the CRC function's very serial-based derivation.

The following describes the CRC hash function as applied to a 32-bit data packet for use in an IPv4 Internet communication. One embodiment of a CRC polynomial for generating a random index value from the 32-bit data packet is:

$$X^{32}+X^{26}+X^{23}+X^{22}+X^{16}+X^{12}+X^{11}+X^{10}+X^8+X^7+X^5+X^4+X^2+X+1,$$

where the variable X represents a register, and the coefficients of the variable X represent bits that will be selected for the CRC (e.g. bit 32, bit 26, and the like).

Using this CRC polynomial, one may obtain a 32-bit index randomly generated for a 32-bit address header associated with the data packet. The index can be further reduced in length based, in part, on a predetermined bit mask. The index may be combined with the corresponding address header and data payload from the data packet, and reinserted into an IPv4 data stream of packets. A subsequent traffic device in the network, such as a router, a network translation device, and the like, may employ the index to further route the data packet.

The present invention is not limited to the above described CRC polynomial, and another may be used. Additionally, although a data stream comprising 32-bit data packets is employed for illustration purposes, the invention is not limited to a data width of 32-bits. Furthermore, the invention is not limited to a maximum size input operand of 32-bits. For example, a data packet containing 128-bit addresses for input operands and another CRC polynomial may be employed for a network system using an IPv6 protocol, and the like.

In software, performing the above described process may take in excess of a thousand cycles for a data packet, regardless of whether the data packet is 64-bytes or 1500-bytes long. Therefore, the use of a CRC hash function in software may be prohibitively time consuming. However, as described below, a similar set of operations may take as few as ten cycles when performed by the present invention. This may provide an increased efficiency through reduced operation time and less need for memory.

Illustrative Operating Environment

FIG. 1 illustrates one embodiment of network system 100, in which the present invention may be practiced. As will be described in more detail below, the present invention is directed to a method and apparatus for managing network traffic in at least a portion of a network. Network system 100 may include many more, or less, components than those shown, however, those shown are sufficient to disclose an illustrative environment for practicing the invention.

As shown in FIG. 1, network system 100 includes Local Area Network/Wide Area Networks (LAN/WANs) 102, 104, and 108, and traffic devices 106 and 110.

LAN/WANs 102 and 108 are in communication with traffic device 110. Traffic device 106 is in communication with LAN/WAN 104 and LAN/WAN 102.

LAN/WANs 102, 104, and 108 are enabled to employ any form of computer readable media for communicating information from one electronic device to another. In addition, LAN/WANs 102, 104, and 108 can include the Internet in addition to local area networks, wide area networks, direct connections, such as through a universal serial bus (USB) port, other forms of computer-readable media, and any combination thereof. On an interconnected set of LANs, including those based on differing architectures and protocols, a router acts as a link between LAN's, enabling messages to be sent from one to another. Also, communication links within LANs typically include twisted pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices may be remotely connected to either LANs or WANs via a modem and temporary telephone link. In essence LAN/WANs 102, 104, and 108 may include any communication mechanism by which information may travel between network devices.

Traffic devices 106 and 110 are configured to manage transportation of a data packet between LAN/WANs 102, 104, and 108 employing a CRC indexing scheme, according to one embodiment of the present invention. In another embodiment, traffic devices 106 and 100 may reside within LAN/WANs 102, 104, and 108 and manage internal network traffic.

Traffic devices 106 and 110 may be configured to operate as a router, a firewall, a network translation device, and the like.

Figure 2:
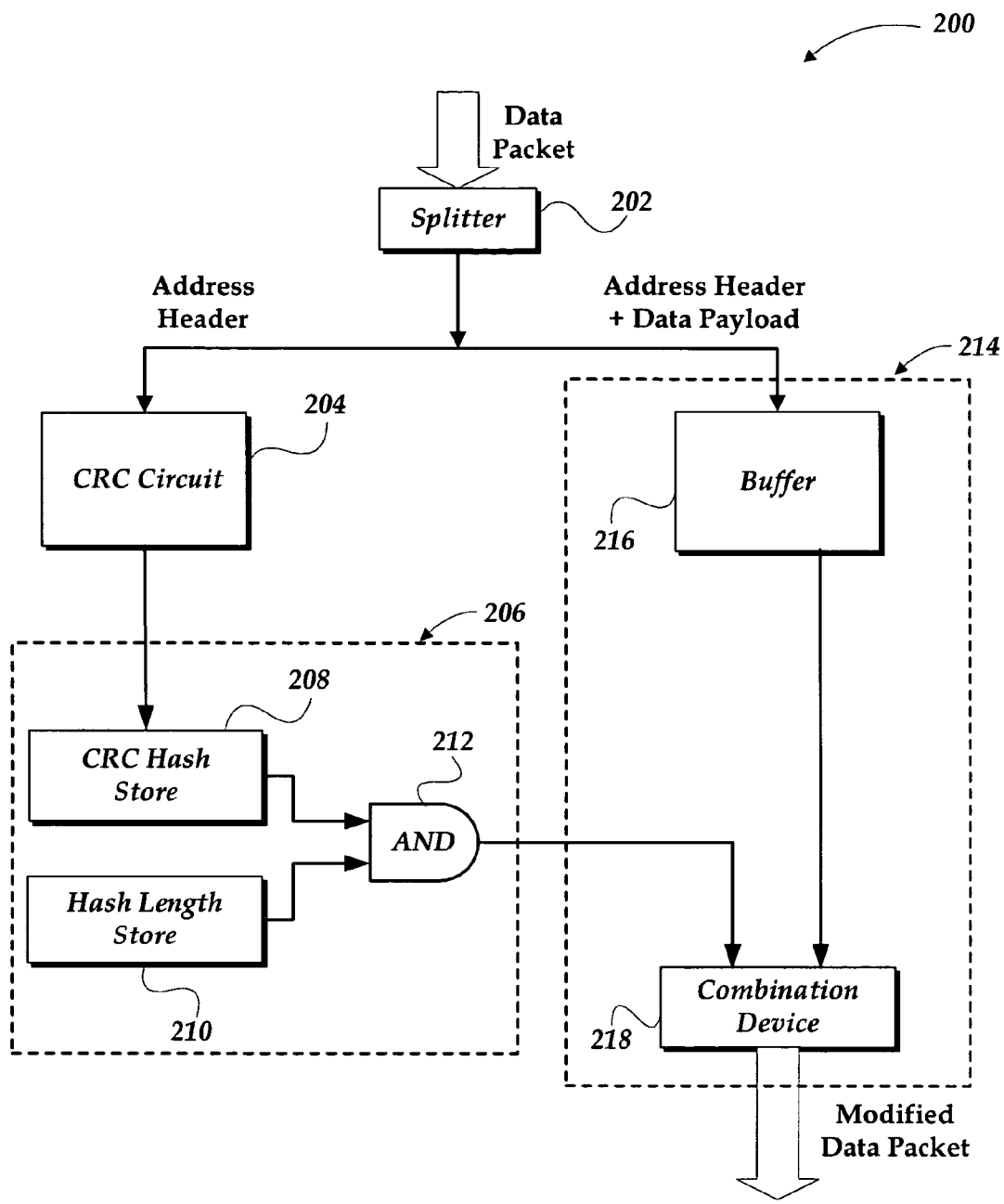
FIG. 2 illustrates a block diagram of one embodiment of an apparatus for determining a CRC index.

FIG. 2 illustrates a block diagram of one embodiment of CRC index system 200 that may be employed within a traffic device, such as traffic devices 106 and 110 of FIG. 1. CRC indexing system 200 may include many more or fewer components than those shown. The components shown, however, are sufficient to disclose an illustrative embodiment for practicing the invention.

As shown in FIG. 2, CRC index system 200 includes splitter 202, CRC circuit 204, scaling circuit 206, and reinsertion circuit 214. Scaling circuit 206 comprises CRC hash store 208, hash length store 210, and AND'ing circuit 212. Reinsertion circuit 214 comprises buffer 216 and combination device 218. CRC circuit 204, scaling circuit 206, and reinsertion circuit 214 are an illustrative embodiment of CRC index system 200, and may be combined, rearranged, split into smaller sub-circuits, and the like, to perform essentially the same actions.

Splitter 202 is coupled to CRC circuit 204 and buffer 216. CRC circuit 204 is coupled to CRC hash store 208, which in turn is coupled to one of the inputs of AND'ing circuit 212. Hash length store 210 is coupled to another input of AND'ing circuit 212. An output of AND'ing circuit 212 is coupled to combination device 218 along with an output of buffer 216.

Splitter 202 is configured to receive a data packet and determine a data payload and an address header from the received data packet. The address header may include any form of network addressing information including, but not limited to an IP header five-tuple, and the like. Splitter 202 may copy the address header to CRC circuit 204 while forwarding the data packet to buffer 216. Splitter 202 may be implemented as a decoder, shift register, and the like.

CRC circuit 204 is configured to determine a CRC index based, in part, on the address header. CRC circuit 204 may employ the CRC polynomial described above to determine the CRC index, which may be determined through a polynomial division between the address header and the CRC polynomial. In the example of a 32 bit system, applying this method to a 32-bit address header may yield a single, random 32-bit index.

CRC circuit 204 may be implemented as a shift register, an XOR-FlipFlop chain, and the like, according to one embodiment of the present invention, but may also comprise virtually any type of determination circuit, configured to determine a CRC.

CRC hash store 208 includes virtually any device configured to receive and store the CRC index. CRC hash store 208 may be implemented as a register, a memory device, and the like.

Hash length store 210 includes virtually any device configured to receive and store a predetermined bit mask for the CRC index. At least one bit from the CRC index may be selected to be used in a resultant index. The at least one bit may include one or more bits selected from a consecutive group of bits in a beginning, middle, or end region of the CRC index. The selected bits may also be a non-consecutive group of bits, such as every other bit of the CRC index, and the like. Hash length store 210, which may be implemented as a register, a memory device, and the like, stores an index that determines which bits of the CRC index will be masked. In one embodiment, the predetermined bit mask stored in hash length store 210 may be a masking index.

AND'ing circuit 212 includes any device configured to combine an output from CRC hash store 208 and hash length store 210 to provide masked bits from the CRC index to the resultant index. Although described as an AND'ing circuit, the present invention is not limited to an AND'ing operation. For example, an "or" circuit, an XOR circuit, a comparator, and the like, may also be employed.

Buffer 216 includes virtually any device configured to receive and store the data packet during the CRC index determination and scaling actions. Buffer 216 may be implemented as a register, a memory device, and the like.

Combination device 218 includes any device configured to combine the data packet received from buffer 216 and the resultant index received from scaling circuit 206 to provide a modified data packet. The resultant index may be combined with the data packet in a variety of ways, including, but not limited to prepending the resultant index to the address header, encrypting the address header with the resultant index, and the like. Combination device 218 may be implemented as a multiplexer, a memory, an encoder, an encryption device, and the like.

The above described CRC index system 200 may be implemented as part of a traffic device. The traffic device may read the resultant index, remove the resultant index from the data packet and route the data packet to its destination. In another embodiment, the traffic device may transmit the data packet with the resultant index, in which case the routing may be employed by another traffic device. Thus, a traffic device may transmit the modified data packet from CRC index system 200 as is, or remove the resultant index and transmit the original data packet.

The improved efficiency of the present invention in hardware may be illustrated by comparing a number of clock cycles as employed by a hardware and software implementation. To calculate the CRC index for a 32-Bit word, it may be necessary to process first 6 long-words, each using a single clock cycle in CRC circuit 204. Concurrently, the same 6 long-words are written to buffer 216. This may be followed by two additional clock cycles, one for the release of the CRC index to CRC hash store 208 and one for AND'ing the outputs of CRC hash store 208 and hash length store 210. Finally, two more clock cycles may be used for combining the resultant index the data packet and reinserting the data packet into a data stream. Thus, the present invention may take as few as ten clock cycles when performed in hardware for a 32-bit system. A comparable operation in software may take anywhere from many hundreds of cycles to well in excess of thousand cycles. This may make the process prohibitively time consuming for some network systems.

General Operation

Figure 3:
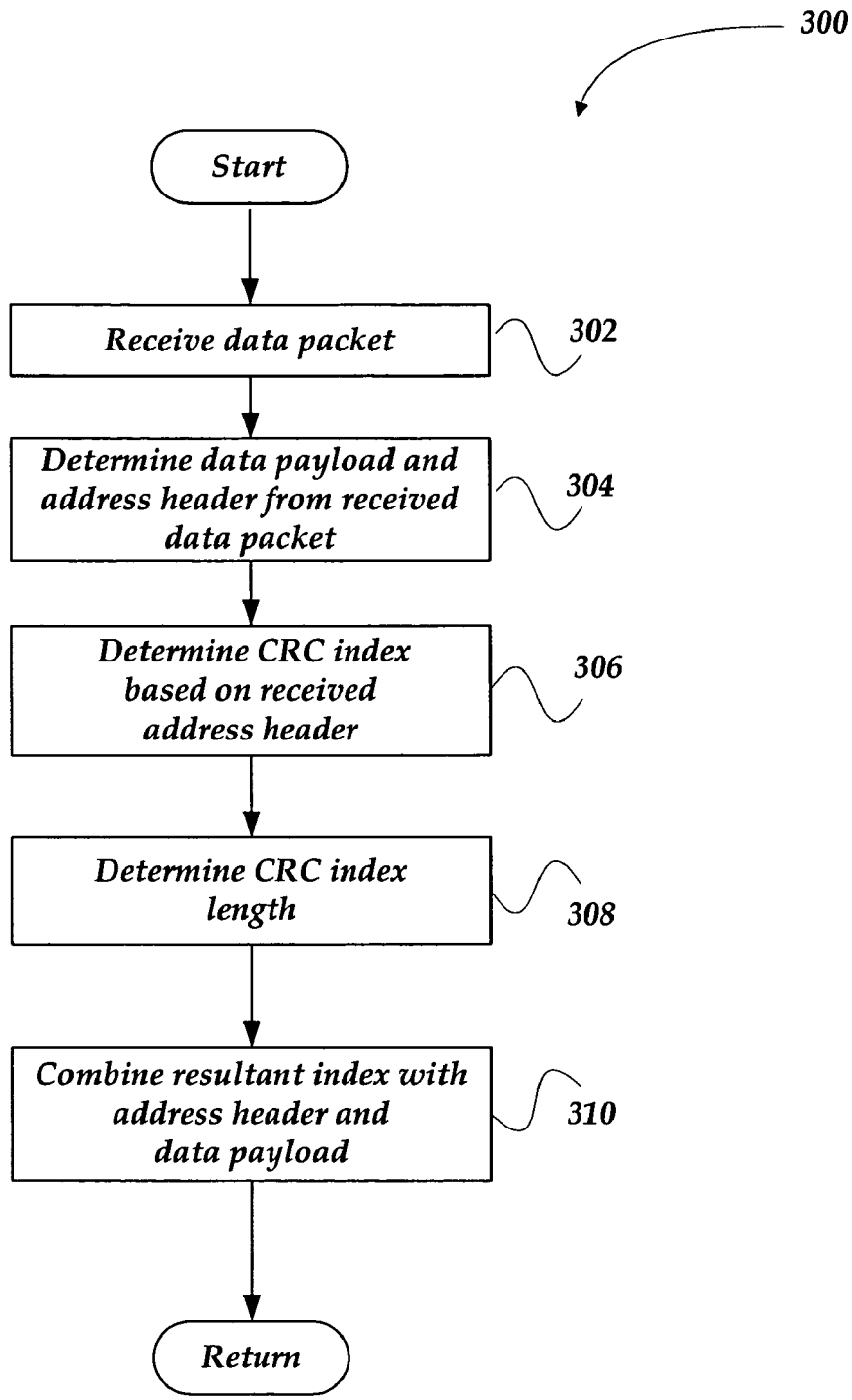
FIG. 3 illustrates a flow diagram generally showing a process for determining a CRC index, in accordance with one embodiment of the present invention.

FIG. 3 illustrates a flow diagram generally showing one embodiment of a process for determining a CRC index. Indexing process 300 may, for example, operate within CRC index system 200 of FIG. 2.

As shown in FIG. 3, indexing process 300 begins, after a start block, at block 302, if a data packet to be indexed is received. The received data packet may be an IPv4 data packet, IPv6 data packet, and the like.

Processing proceeds to block 304, where a data payload and an address header of the received data packet are determined. The address header, which may be an IP header, a portion of an IP five-tuple, and the like, is copied to a CRC index determination process at block 306.

At block 306, a CRC index is determined based, in part, on the address header. Block 306 may employ the CRC polynomial described above to determine the CRC index, where coefficients of the CRC polynomial represent bit values. A similar polynomial may be formed based on the bits of the address header, and a polynomial division is performed between the CRC polynomial and an address header polynomial. A remainder of the polynomial division provides the CRC index. In the example of a 32-bit system, in compliance with IPv4 protocol, applying this method to a 32-bit address header may yield a single, random 32-bit index.

At block 308, at least one bit is determined from the CRC index providing a resultant index. The at least one bit may include one or more bits determined from the CRC index, including and up to all bits. These bits may be a consecutive group of bits in a beginning, middle, or end region, and the like, of the CRC index. The determined bits may also be a non-consecutive group of bits, such as every other bit of the CRC index, and the like. The group of bits determined from the CRC index determines a length of the resultant index.

At block 310, the resultant index is combined with the data packet providing a modified data packet. Combination process may be performed by a variety of methods, including prepending, appending, and the like, the resultant index to the address header. The resultant index may also be inserted into a predetermined position inside the address header. In yet another embodiment, the address header may be encrypted with the resultant index.

The resulting modified data packet may be transmitted over a network for use in routing, and the like, based, in part, on the resultant index information. In another embodiment, routing information from the resultant index may be retrieved prior to transmittal over the network and the resultant index removed from the data packet. In this embodiment, the original data packet may be transmitted over the network. Upon completing block 310, indexing process 300 returns to a calling process to perform other actions.

It will be understood that each block of the flowchart illustration, and combinations of blocks in the flowchart illustration, can be implemented by a combination of hardware-based systems and software instructions. The software instructions may be executed by a processor to cause a series of operational steps to be performed by the processor to produce a computer implemented process such that the instructions, which execute on the processor, provide steps for implementing some or all of the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. An apparatus for managing a signal over a network, comprising:
    a Cyclical Redundancy Check (CRC) circuit configured to receive at least a portion of the signal and determine a CRC index based, in part, on the portion of the signal;
    a scaling circuit, coupled to the CRC circuit, that is configured to determine at least one bit from the CRC index; and
    a reinsertion circuit, coupled to the scaling circuit, that is configured to determine a modified signal by combining the at least one bit selected from the CRC index with the signal, wherein the at least one bit selected from the CRC index enables routing of the modified signal over the network.

2. The apparatus of claim 1, wherein the portion of the signal further comprises an address header.

3. The apparatus of claim 1, wherein the at least one bit further comprises at least one bit determined by AND'ing the CRC index with a predetermined bit mask.

4. The apparatus of claim 1, wherein the at least one bit further comprises at least one of a non-consecutive number of bits, at least two bits, a consecutive number of bits, and all of the bits.

5. The apparatus of claim 1, wherein the portion of the signal further comprises at least one of a source address, a destination address, a source port, a destination port, and a protocol.

6. The apparatus of claim 1, wherein the CRC circuit further comprises a circuit that is arranged to perform actions, including at least one of a 32-bit CRC polynomial computation and a 128-bit CRC polynomial computation.

7. The apparatus of claim 1, wherein the CRC circuit further comprises at least one of a shift register, a memory, and an XOR-FlipFlop chain.

8. The apparatus of claim 1, wherein the scaling circuit further comprises:
    a hash length store configured to hold a predetermined bit mask; and
    an AND'ing circuit, coupled to the hash length store, that is arranged to select the at least one bit from the CRC index by combining the CRC index with the predetermined bit mask.

9. The apparatus of claim 8, wherein the hash length store further comprises at least one of a register and a memory.

10. The apparatus of claim 1, wherein the reinsertion circuit further comprising:
    a buffer configured to hold the signal; and a combination device, coupled to the buffer, that is configured to determine the modified signal, in part, by combining the at least one bit selected from the CRC index with the signal.

11. The apparatus of claim 10, wherein the buffer further comprises a First-In-First-Out (FIFO) buffer.

12. The apparatus of claim 10, wherein the combination device further comprises at least one of a multiplexer, a comparator, a memory, and an encoder.

13. A device for managing traffic over a network, comprising:
a transceiver that is arranged to perform actions, including:
receiving a data packet in a flow of data packets;
determining an address header associated with the data packet; and
forwarding the address header; and
an indexing device, coupled to the transceiver, that is arranged to perform actions, including:
receiving the address header;
determining a CRC index based, in part, on the address header;
determining a subset of bits from the CRC index; and
determining a modified data packet by combining the determined subset of bits from the CRC index with the data packet, wherein the subset of bits from the CRC index enables routing of the data packet over the network.

14. The device of claim 13, further comprising a reinsertion circuit that is coupled to the indexing device, and arranged to perform actions including:
reinserting the data packet into a data stream.

15. The device of claim 13, wherein the address header further comprises at least one of a source address, a destination address, a source port, a destination port, and a protocol.

16. The device of claim 13, wherein the device is operable in at least one of a load-balancer, a router, a firewall, a proxy, a bridge, and a network translation device.

17. The device of claim 13, wherein the subset of bits from the CRC index further comprises at least one of a non-consecutive number of bits, at least two bits, a consecutive number of bits, and all of the bits.

18. A method for routing traffic over a network, comprising:
receiving a data packet in a flow of data packets;
determining an address header associated with the data packet;
determining a CRC index based, in part, on the address header;
selecting at least one bit from the CRC index; and
determining a modified data packet by combining the at least one selected bit from the CRC index with the data packet, wherein the at least one selected bit from the CRC index enables routing of the data packet over the network.

19. The method of claim 18, further comprising:
reinserting the modified data packet into a data stream.

20. The method of claim 18, wherein the method is operable in at least one of a load-balancer, a router, a firewall, a proxy, a bridge, and a network translation device.

21. The method of claim 18, wherein the address header further comprises at least one of a source address, a destination address, a source port, a destination port, and a protocol.

22. The method of claim 18, further comprising:
determining a destination of the data packet by comparing the at least one selected bit from the CRC index to information in a routing table.

23. The method of claim 18, wherein determining the modified data packet further comprises at least one of prepending, appending, and encrypting the address header of the data packet with the at least one selected bit from the CRC index.

24. A device for routing a data packet over a network, comprising:
a means for receiving a data packet in a flow of data packets;
a means for determining an address header associated with the data packet;
a means for determining a CRC index based, in part, on the address header;
a means for selecting at least one bit from of the CRC index; and
a means for determining a modified data packet based, in part, on combining the at least one selected bit from the CRC index with the address header of the data packet, wherein the at least one selected bit from the CRC index enables routing of the data packet over the network.

25. A system for managing traffic over a network, comprising:
a first network device, configured to perform actions, comprising:
receiving a data packet in a flow of data packets;
determining an address header associated with the data packet;
determining a CRC index based, in part, on the address header;
selecting at least one bit from of the CRC index; and
determining a modified data packet by combining the at least one selected bit from the CRC index with the data packet; and
a second network device, in communication with the first network device, configured to perform actions, comprising:
receiving the modified data packet; and
routing the modified data packet based, in part, on the at least one selected bit from the CRC index.

* * * * *